Figure 1:
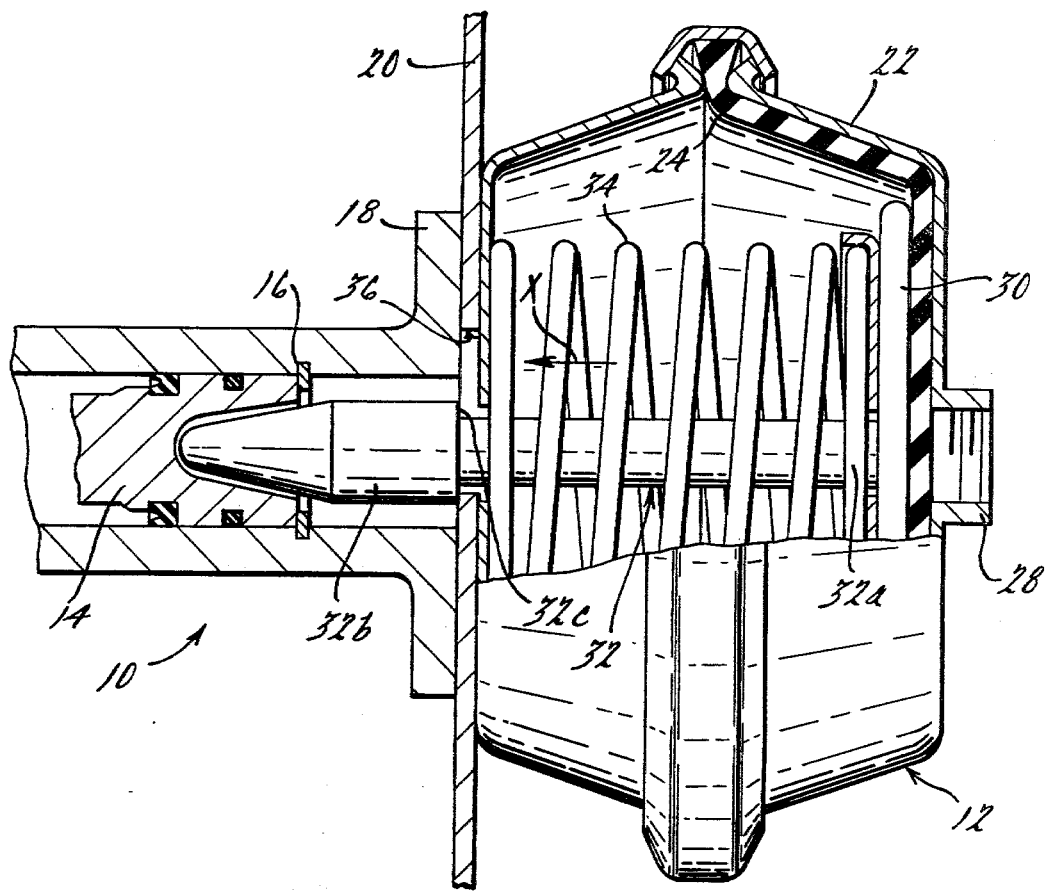

United States Patent [19]

Martin

[11] 4,201,057
[45] May 6, 1980

[54] AIR HYDRAULIC BRAKE ACTUATOR

[75] Inventor: Terence A. Martin, Chelmsford, England

[73] Assignee: Ford Motor Company, Dearborn, Mich.

[21] Appl. No.: 929,752

[22] Filed: Jul. 31, 1978

[30] Foreign Application Priority Data

Aug. 31, 1977 [GB] United Kingdom ............... 36275/77

[51] Int. Cl.² ............................................. F15B 15/18
[52] U.S. Cl. .......................................... 60/593; 92/128; 92/129
[58] Field of Search ................... 60/547 R, 548, 593; 92/129, 128; 403/253, 254

[56] References Cited

U.S. PATENT DOCUMENTS

| 2,908,137 | 10/1959 | Spalding | 60/548 |
| 3,678,687 | 7/1972 | Watabe | 60/593 |
| 3,893,379 | 7/1975 | Cripe | 60/547 |
| 3,898,809 | 8/1975 | Baker | 60/548 |
| 3,926,092 | 12/1975 | Meyers | 60/548 |
| 3,926,093 | 12/1975 | Nakagawa | 60/547 |

FOREIGN PATENT DOCUMENTS

| 2501099 | 7/1975 | Fed. Rep. of Germany | 403/254 |
| 666364 | 2/1952 | United Kingdom | 60/547 |

*Primary Examiner*—Abraham Hershkovitz
*Attorney, Agent, or Firm*—Peter Abolins; Clifford L. Sadler

[57] ABSTRACT

An air/hydraulic actuator for a vehicle braking system uses a surface on a push rod to easily and quickly position the push rod with respect to a piston slidable in the base of a hydraulic master cylinder so that with no air pressure the air actuator push rod is just clear of the piston to ensure complete return of this piston.

1 Claim, 2 Drawing Figures

AIR HYDRAULIC BRAKE ACTUATOR

This invention relates to an air/hydraulic actuator for use in vehicle braking systems.

In heavier goods vehicles it is common to use compressed air from an engine-driven compressor to actuate a vehicle braking system. This requires an air/hydraulic actuator consisting essentially of a hydraulic master cylinder and a compressed air actuator having a push rod arranged to actuate the master cylinder piston.

The master cylinder and air actuator are commonly mounted on either side of a mounting bracket secured to the vehicle chassis. With no air pressure, the air actuator push rod must be just clear of the master cylinder piston to ensure complete return of the piston and operation of the hydraulic recoup valve. This clearance has hitherto been obtained by insertion of spacing shims between the hydraulic master cylinder and the mounting bracket. However, since the push rod and pistons have not been visible in the assembled state, the selection of the correct shims has been dependent on measurement of components, which is time-consuming and prone to error.

An object of the present invention is to provide an air/hydraulic actuator which is simple yet accurate to mount.

The invention accordingly provides an air/hydraulic actuator for a vehicle braking system, comprising a hydraulic master cylinder having a bore open at one end and adapted for mounting adjacent the open end of the bore to one face of a vehicle member, a piston slidable in the bore, a stop in the cylinder for limiting movement of the piston in one direction, a pneumatic actuator adapted to be mounted to an opposite face of the vehicle member and including a push rod engageable with the piston to move it away from the stop on application of compressed air to the actuator, the push rod normally being biased away from the actuator, the push rod extending in use through an aperture in the vehicle member and being formed with a stop surface engageable with said one face of the vehicle member.

Figure 2:
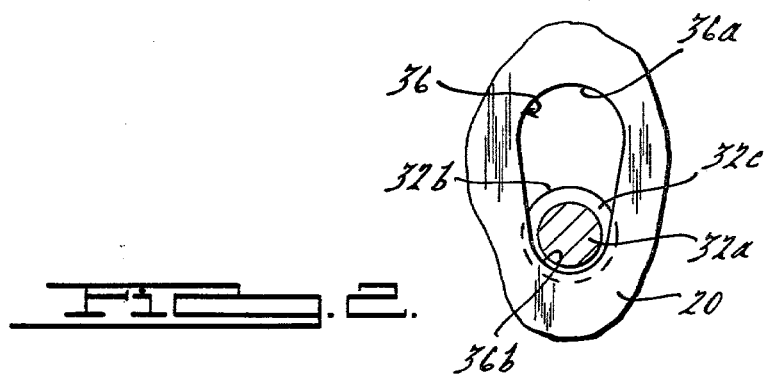

An embodiment of the invention will now be described by way of example, with reference to the accompanying drawings, in which:

FIG. 1 is a side elevation, mainly in central cross-section, of an actuator in accordance with the invention; and FIG. 2 is a scrap view in the direction of the arrow X, showing the relationship between the push rod of the pneumatic actuator and a slot on the member mounting the actuator.

Referring to FIG. 1 and air/hydraulic actuator comprises a hydraulic master cylinder 10 and a pneumatic actuator 12. A piston 14 slidably received within the cylinder 10 is normally biased towards a stop constituted by a split ring 16 seated in a groove in the bore of the cylinder 10. The piston 14 may be moved by the actuator 12 in the opposite direction to pressurise the braking system in the usual manner.

The master cylinder 10 has a mounting flange 18 at its open end, the flange 18 being secured, e.g. by bolts (not shown), to a vehicle member 20 which may be a mounting bracket secured to a vehicle chassis or may be a chassis member such as a side rail.

The actuator 12 comprises a sheet metal housing 22 divided by a flexible diaphragm 24 into two chambers, one of which is vented to atmosphere while the other is connected in use via a coupling 28 and air line (not shown) to a compressed air source. A plate 30 is secured to the central part of the diaphragm 24 and mounts a push rod 32 for driving the master cylinder piston 14. A spring 34 biases the diaphragm 24 and push rod 32 away from the piston 14. The pneumatic actuator 12 is also mounted on the vehicle member 20, suitably by bolts (not shown) passed through the housing 22. The member 20 is apertured at 36 to permit the push rod 32 to extend into the bore of the master cylinder 10.

It is desired that, when no air pressure is acting on the diaphragm 24, the push rod 32 should be just clear of engagement with the piston 14, the latter being in abutment with the stop 16. The distance between the stop 16 and the face of the mounting flange 18 is known to a high degree of accuracy, dependent only on the manufacturing tolerances involved in machining the face of the flange and the groove for the stop 16. The face of the flange 18 is substantially coplanar with the adjacent face of the member 20, and the present invention makes use of these facts in fixing the inoperative position of the push rod 32, as will now be described.

The push rod 32 is formed as a stem portion 32a and an enlarged nose portion 32b, an annular shoulder 32c being defined between the two. The aperture 36 is of keyhole shape, (see FIG. 2), having a larger part 36a greater in width than the push rod nose portion 32b, and a smaller part 36b smaller in width than the nose portion 32b but sufficiently large to permit the passage of the stem portion 32a.

In the installed position, as seen in the drawings, part of the shoulder 32c therefore engages the periphery of the aperture 36 in its smaller part 36b when the push rod is retracted. Thus, by forming the nose portion 32b such that the distance between its tips and the shoulder 32c is accurately known, the correct spacing between the push rod and the master cylinder piston can be ensured, regardless of the accuracy of the dimensions of other parts of the pneumatic actuator 12 and its mounting.

When assembling the actuator 12 to the vehicle member 20, the push rod 32 may be extended against the bias of the spring 34 to facilitate insertion of the nose portion 32b through the larger aperture part 36a. The shoulder 32c may then be engaged and the actuator secured in position.

Other forms of stop surface may be used. For example, the push rod may be provided with a radial projection which can be inserted through a keyhole slot in the vehicle member, the push rod then being rotated to trap the projection behind the member.

What we claim is:

1. An air/hydraulic actuator for a vehicle braking system, comprising a hydraulic master cylinder having a bore open at one end and adapted for mounting adjacent the open end of the bore to one face of a vehicle member, a piston slidable in the bore, a stop in the cylinder for limiting movement of the piston in one direction, a pneumatic actuator adapted to be mounted to an opposite face of the vehicle member and including a push rod engagable with the piston to move it away from the stop on application of compressed air to the actuator, the push rod normally being biased away from the piston, the push rod extending in use through an aperture in the vehicle member and being formed with a stop surface engageable with said one face of the vehicle member;

said stop surface being in the form of an annular shoulder at right angles to the longitudinal axis of the push rod; and a vehicle member having an aperture for passage of the push rod, the aperture being elongate with a narrow portion dimensioned to engage said stop surface and a broad portion dimensioned to permit the stop surface to pass therethrough during assembly and disassembly.

* * * * *